Figure 2A:
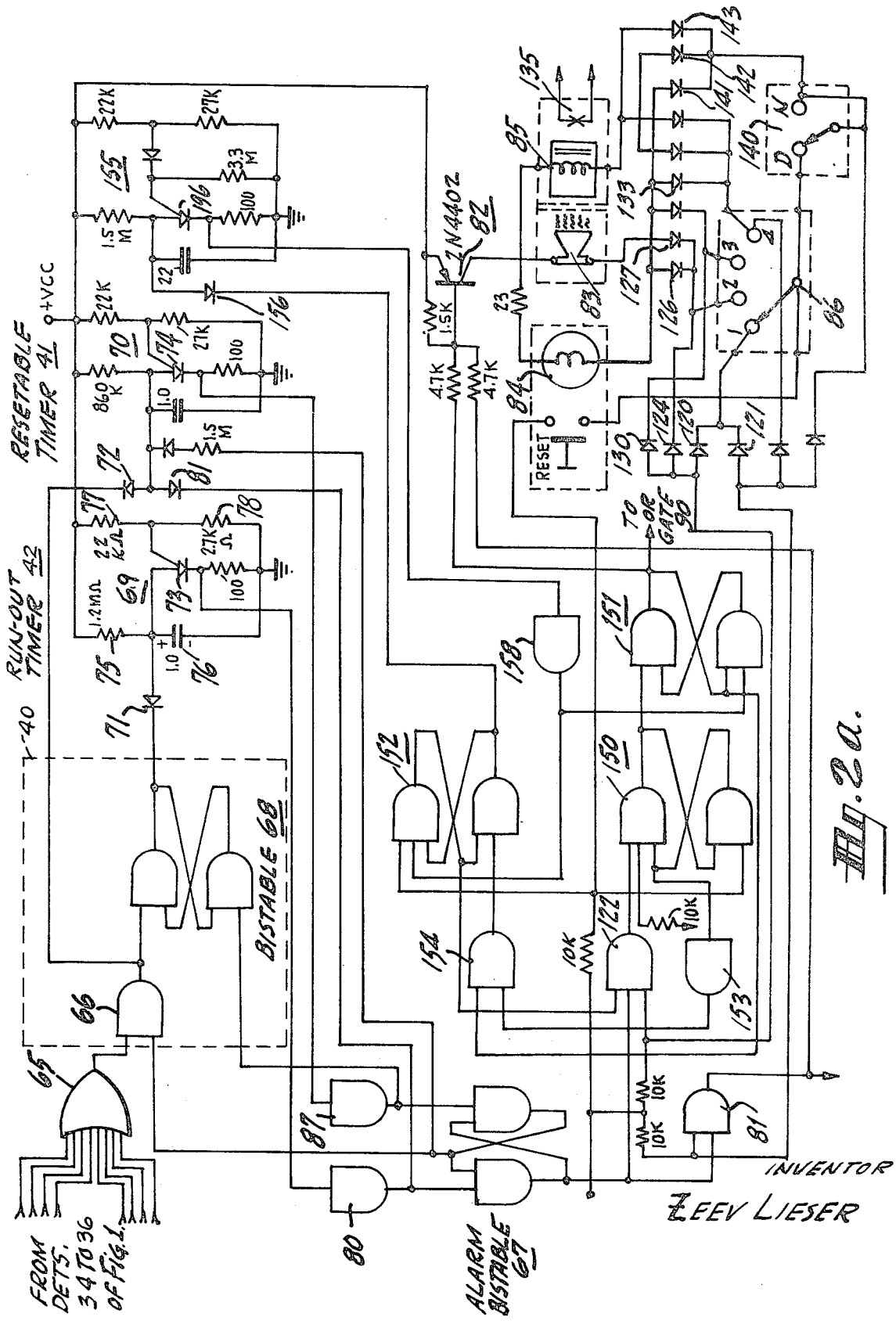

United States Patent
Lieser

[15] 3,680,074
[45] July 25, 1972

[54] INTRUSION SYSTEMS EMPLOYING DIGITAL PROCESSING CIRCUITRY

[72] Inventor: Zeev Lieser, 1048 Coolidge Road, Elizabeth, N.J. 07208

[22] Filed: Nov. 3, 1969

[21] Appl. No.: 873,550

[52] U.S. Cl. .............................340/258 A, 307/220, 328/34, 343/5 PD
[51] Int. Cl. ...................................G08b 25/00, H03k 23/00
[58] Field of Search.................343/5 PD, 5 DP, 7.7; 307/220, 307/221; 340/258 A; 328/34, 37

[56] References Cited

UNITED STATES PATENTS

| | | | |
|---|---|---|---|
| 1,536,933 | 5/1925 | Rose | 340/276 |
| 1,649,534 | 11/1927 | Lawhon | 340/276 |
| 3,197,772 | 7/1965 | Robert et al. | 340/258 A |
| 3,084,285 | 4/1963 | Bell et al. | 328/34 |
| 3,277,473 | 10/1966 | Calhoon, Sr. et al. | 343/5 DP |
| 3,325,729 | 6/1967 | Vinzelberg et al. | 343/5 DP |
| 3,228,028 | 1/1966 | Baum et al. | 343/7.7 |

Primary Examiner—Malcolm F. Hubler
Attorney—John E. Toupal

[57] ABSTRACT

A plurality of Doppler systems are utilized to monitor a plurality of locations against intrusions by radiating energy covering the volume enclosed by said location and providing a Doppler frequency shift for the presence of an intruder. Each of said Doppler signals if present are impressed upon a carrier frequency and transmitted for propagated along a common path to a monitor location.

A plurality of detector circuits at the monitor location each respond to one of said carrier frequencies to provide an output signal representative of said Doppler frequency generated by said one location. A gating circuit has a plurality of input terminals each coupled to one of said detector circuits to provide an output signal between first and second levels having a repetition rate determined by said Doppler frequency.

A first timing circuit is caused to initiate a time delay upon activation thereof by said first voltage level from said gate and resets upon receipt of said second voltage level. A second timing circuit commmences a larger time delay on receipt of said second voltage level from said gate and if not reset by said first circuit indicates that the receipt of said transmitted signal along said path was in fact a true Doppler frequency.

The processing circuit including the first and second timing circuits further includes alarm activating means and a plurality of location gates to indicate to a security guard both the presence of a true Doppler frequency and, therefore an intrusion, and the locations at which the intrusion is taking place.

12 Claims, 3 Drawing Figures

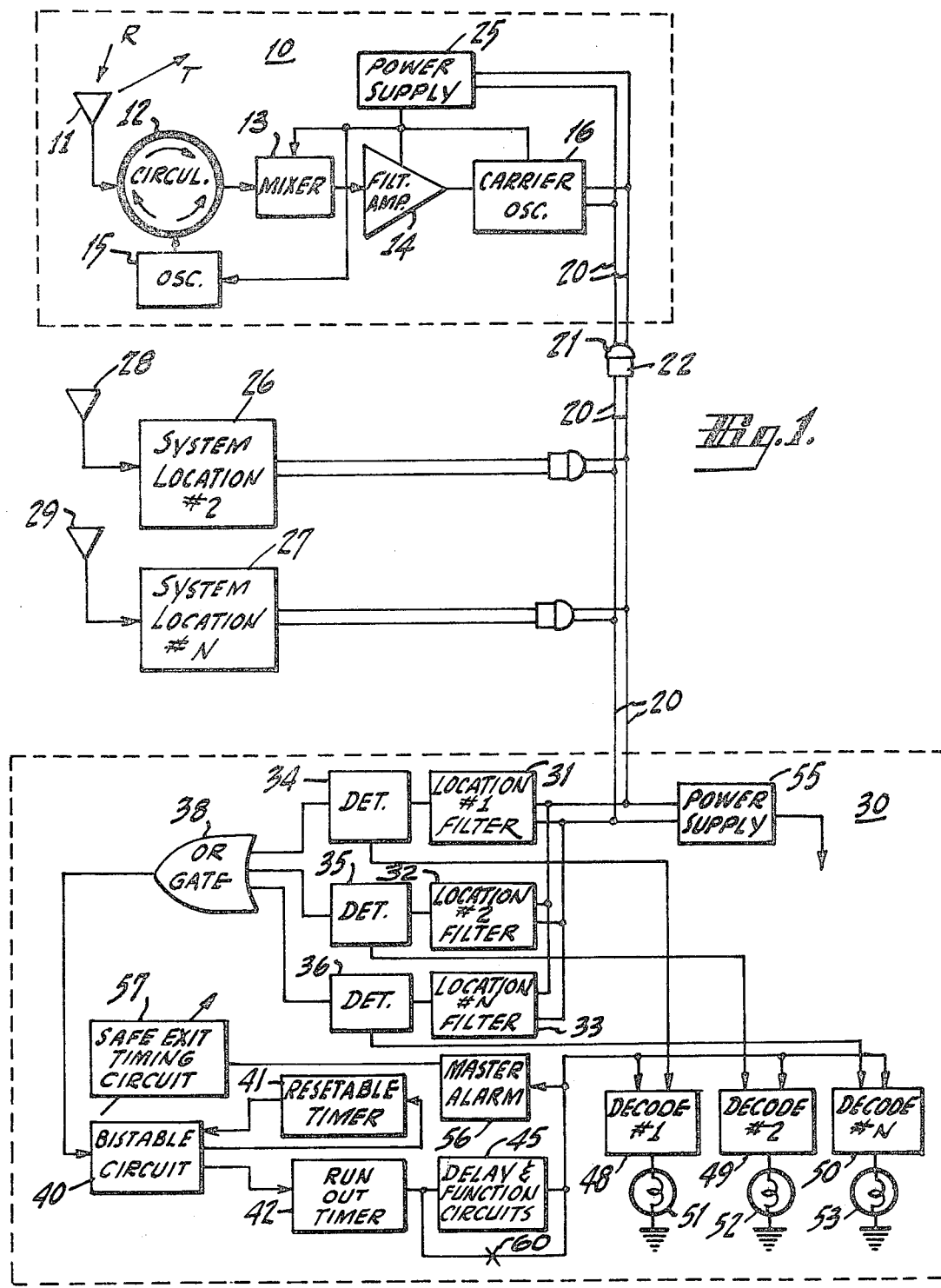

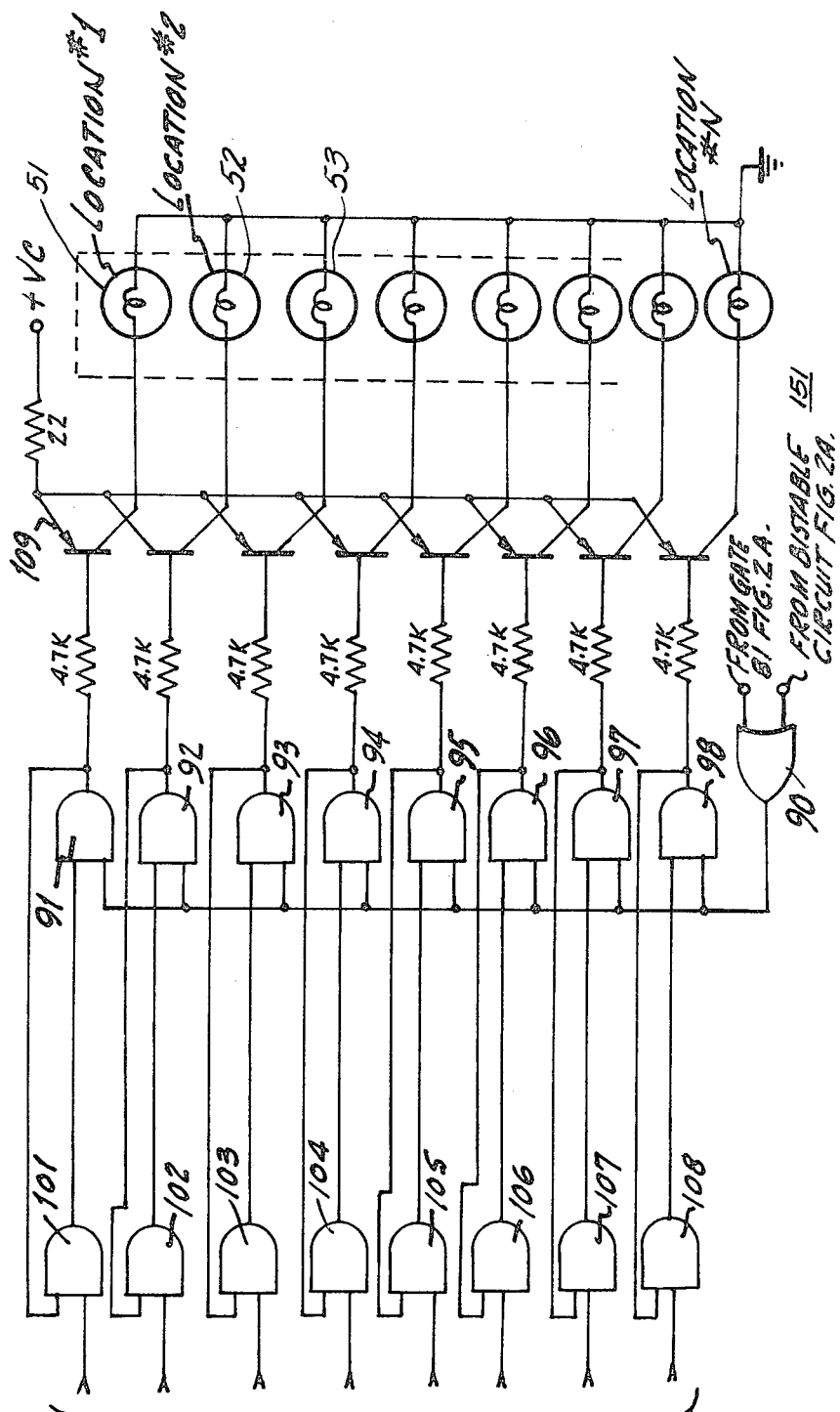

INTRUSION SYSTEMS EMPLOYING DIGITAL PROCESSING CIRCUITRY

This invention relates to intrusion detection systems, and more particularly, to such systems employing digital processing techniques.

In general, the prior art has proposed a plurality of different systems for determining the presence of an unauthorized person within secured premises. Many of the systems employed utilize the so called Doppler effect for intrusion detection.

Doppler systems employ either electromagnetic or acoustical energy coupled to an antenna which radiates the energy about the area to be protected. A receiver simultaneously receives the radiated energy which includes that energy which may be reflected from an unauthorized moving person. The reflected wave energy and the transmitted wave energy are conventionally mixed with one another. If an object was within the area to be protected, the reflected wave energy would thereby differ in frequency from the transmitted wave energy, resulting in an output signal from the mixer which would be at the difference in frequency determined by the well known Doppler effect.

Such Doppler systems as utilized in the prior art are relatively reliable in the sense that they can operate on relatively large areas for the detection of intrusions. However, in certain of the prior art detection systems, there is no provision for discriminating against movement in the area which movement is not necessarily caused by the presence of an unauthorized person. Such movements, for example, may be produced by electrical discharges as affecting the frequency of the systems, appliances such as fans, which by their very nature, move or vibrate, and other items as well.

The prior art has attempted to obtain discrimination against activating the Doppler detection system by extraneous causes other than an actual intrusion.

For example, certain prior art systems utilize an amplitude discrimination technique followed by an amplitude or threshold responsive comparator circuit. These systems operate on the principle that a larger target, as a person, reflects more radiation and thereby produces a larger amplitude Doppler signal which is then detected above a certain threshold, enabling the system to discriminate against smaller amplitude Doppler signals caused by the movement of small objects such as animals, fans, etc.

Still other systems employ discrimination which include techniques for processing signals which have specific modulation characteristics of frequency, amplitude and time duration. These systems utilize the characteristics of the Doppler signal as to repetition rate, amplitude, and duration to provide an alarm signal for those signals which possess the above noted characteristics within predetermined boundaries. These systems exhibit more reliable operation than many of the prior art systems but are limited in that the means for manufacturing a reliable and inexpensive unit is complicated because of the stringent operating characteristics dictated by the system design.

In any event, the prior art is replete with a plurality of different types of Doppler systems which may be utilized to afford protection in a given area by sounding an alarm and so on.

Due to the nature of modern factory installations and office buildings, and in general, areas of residential and commercial activity which one may desire to protect against intrusion, it has been found that the use of a single system becomes difficult. This is so, as the areas to be protected may be isolated from one another, as well as such areas may have peculiar shapes whereby the structure of walls, including steel beams, and so on, may undesirably operate to interfere with Doppler system security. In this manner, it would be desirable to utilize a plurality of Doppler systems to cover a plurality of remote locations, each of said systems being monitored by a single apparatus which will give a security guard or other person an accurate display or indication of which one of the plurality of monitored areas is being intruded upon. Such a system would have to be reliable, inexpensive and accurate in order to meet the requirements of present day security protection.

Furthermore, such a processing system for monitoring a plurality of locations is applicable for use in other detection systems not concerned with intrusion detection, as in fire protection systems, or other types of burglar protection systems not necessarily utilizing the Doppler effect.

It is therefore an object of the present invention to provide an improved apparatus for use with a detection system for monitoring a plurality of locations.

A further object is to provide a digital processing circuit useful for displaying an unauthorized condition at any one of a plurality of different locations.

A further object is to provide an improved Doppler intrusion system employing digital processing techniques particularly useful for monitoring a plurality of different locations.

These and other objects of the present invention are accomplished in one embodiment thereof by means of a processing circuit adapted to respond to a plurality of Doppler signals provided by a plurality of Doppler systems each associated with a different location to be monitored against intrusions. The Doppler signals are impressed upon a separate carrier oscillator signal at each location and propagated along a common transmission path for application to a plurality of selective, filter-detector circuits each having a center frequency about one of said carrier frequencies to provide at the output a detected signal representative of the Doppler signal at any one of said locations.

The detected signals are applied to separate inputs of a common gate which provides at an output a signal between first and second voltage levels representative of the Doppler signal.

The output of the gate commences a timing period of given duration by a first timing circuit for said first voltage level and resets the timing circuit for the second voltage level. A second timing circuit having a larger time delay than the first is also activated by the second voltage level to commence the time delay. The second circuit if not reset by the first circuit times out, activating means for producing an alarm while further priming a plurality of coincident location gates having one input coupled to said means for producing an alarm and a second input activated by a separate one of said detectors, whereby said alarm notifies a guard of a valid intrusion and said location gates are coupled to display means for notifying the guard at which one of the locations the intrusion is taking place.

These and other objects will be explained in greater detail if reference is made to the foregoing specification together with the accompanying FIGURES in which:

FIG. 1 is a block diagram of a Doppler intrusion system and detection indicating and processing apparatus according to this invention; and FIGS. 2A and 2B are detailed schematic diagrams of a digital processing circuit as utilized in conjunction with a Doppler system for detecting and indicating Doppler frequency transitions.

Referring to FIG. 1, there is shown an intrusion system employing a plurality of Doppler transceivers for monitoring a plurality of locations including a digital processing circuit for providing an alarm signal and display when any one of said locations is intruded upon. Numeral 10 references a Doppler transceiver arrangement used at each location which is to be monitored within the intrusion system.

Basically, the transceiver 10 includes an antenna 11 which has the input terminals thereof coupled to a port of a circulator 12. Antenna 11 may be an end fire type antenna fabricated from a material having a relatively low loss at frequencies suitable for Doppler operation; such as frequencies within the range of 2.5 GigaHz to 10.5 gigaHz. Basically, a circulator is a device which conducts energy entering at one port to the next port or to a different port. In this manner, energy entering the antenna 11 is conducted via the circulator to the port connected to the input of the mixer 13. Coupled to a third port of the circulator 12 is an oscillator 15. The oscillator 15 is a circuit configuration capable of producing oscillations within the frequency range of 2.5 to 10.5 gHz. Such an oscillator, for example, may include a varactor diode, or tunnel diode, or a high frequency transistor suitably mounted within a microwave cavity tuned to resonate within the above described frequency range. The circulator 12, as indicated above, may be a ferrite, strip line device, also suitable for operation at these frequencies. Oscillator 15, circulator 12 and antenna 11 of suitable configurations are well known and commercially available for application to the system in the above noted frequency range.

In coupling the oscillator 15 to the port of the circulator 12, as shown, oscillator energy is caused to be transferred to both the antenna 11 for transmission of the same, while a portion of energy is also diverted to the port coupled to the mixer 13. The mixer 13 includes a non-linear device, such as a diode, which is suitable for operating at the above noted frequency ranges. The mixer 13 provides the sum and difference frequencies at the output thereof. Such frequencies are produced by mixing the local oscillator frequency with the received frequency responded to by antenna 11. The output of the mixer 13 is coupled to a frequency selective amplifier 14 which functions to select the lower side band output signal of the mixer 13 for application to a carrier oscillator 16. The carrier oscillator 16 operates within the band of frequencies from 100 to 200 kilocycles and is pulsed on and off in response to the output of the filter amplifier 14.

In summation, the units thus described above form the basic components of a Doppler transmitter-receiver system. The antenna 11 transmits energy at the frequency of the local oscillator 15 which energy propagates through an area to be protected by the system. The volume of the area to be protected is determined by the amount of energy transmitted, the frequency of the transmitted energy and the particular beam width or beam shape of antenna 11 utilized. The coupling of the antenna 11 to the oscillator 15 via the circulator 12 permits the transmitted energy as reflected by a moving object to be received by the antenna and coupled via the circulator 12 to the input of the mixer 13. The mixer 13, therefore, serves to provide at its output a signal having a frequency determined by the difference between the local oscillator frequency or the transmitted frequency and the received frequency. The received frequency, if modified by a moving object, will differ from the transmitted frequency by a frequency determined by the Doppler effect.

In most conventional modern day establishments, there is a source of a.c. power supplied by a power company which conveniently is circulated extensively throughout the premises. The system to be described herein takes advantage of the power wiring already existing at the location for the transmission of signals through the power lines for application to a central digital processing circuit 30 useful for determining the particular area intruded upon. In this manner, the output of the carrier oscillator 16 is shown coupled to the input of an a.c. power source or the input to the a.c. power lines 20 via a connector assembly 21 and 22 including the typical male and female receptacles commonly utilized for connecting appliances to the a.c. power lines. Such coupling may be accomplished via capacitors or by a balanced transformer arrangement.

A power supply 25 is also shown coupled to the a.c. power lines via the connector 21 for generating and providing the necessary d.c. operatinG potentials to the various modules included in the transceiver arrangement 10.

In a similar manner, there is shown other transceiver units 26 and 27 employing similar components as those shown for transceiver 10. The units 26 and 27 include individual receiving and transmitting antennas 28 and 29 respectively, for monitoring different locations which may be remote from the first location within a particular building complex in which security protection is desired. Each system, as System Location 2 to System Location $n$, has the transceiver coupled to the power lines as shown by a pair of receptacles similar to those described above for transceiver 10. Each system 26 and 27 also includes a separate carrier oscillator having a frequency different from the oscillators at the other locations. Also shown within FIG. 1 enclosed within the dashed rectangle 30 is the digital processing network according to this invention which functions to provide an alarm during the receipt of a signal representing an unauthorized intrusion at one of the locations, and for further providing, upon receipt of such a signal, an indication determining at which location the intrusion has occurred.

The a.c. power lines 20 are coupled to the inputs of a plurality of selective location filters 31, 32 and 33. Each filter 31 to 33 has a bandwidth determined by the bandwidth of expected Doppler frequency signal shifts and about a center frequency determined by the frequency of the carrier oscillator 16 utilized in each of the different locations and within, for example, the band of frequencies from 100 to 200 kHz. Essentially, the bandwidth of the location filters 31 to 33 determines the limits of the frequency of the Doppler signals to be utilized for purposes of indicating an alarm condition. Each location filter 31 to 33 has an output coupled to a separate detector circuit 34, 35 and 36. The detector circuit may be of the peak envelope detecting type for providing at an output thereof a signal responsive to the peak amplitude of the envelope of the signal coupled to the inputs via the location filters 31 and 33. The output of each detector is coupled to a separate input of an OR gate 38. The OR gate 38 will provide an output for the application of a signal at any one of its inputs. Such an OR gate may be an operational amplifier including a plurality of resistive inputs, one for each particular location, to provide at the output thereof a signal when any of the input circuits are energized. The output from the OR gate 38 is coupled to a bistable circuit 40. The bistable circuit 40 may be a conventional bistable multivibrator which exhibits two stable states and is energized by the OR gate to be triggered from one state to the other state in accordance with the signal at the output of the OR gate 38. Such bistable multivibrators are well known in the art and are not considered part of this invention.

The output of the bistable circuit 40 is coupled to the input of two timing circuits 41 and 42 respectively referenced to as a Resetable Timer 41 and a Run-Out Timer 42. The timers are selected to produce a signal having a predetermined time duration in accordance with the activation of the timing networks from the suitable state of the bistable circuit 40. An output from the Resetable Timer 41 is also coupled to an input of the bistable circuit 40 for inhibiting the same as will be described subsequently. The output from the Run-Out Timer 42 is coupled to a module 45 referred to as delay and function circuits. The function of module 45 is to provide suitable shaping and delay to the waveform produced by the Run-Out Timer 42 before application of the signal to decode circuits 48, 49 and 50. The decode circuits 48 to 50 may be ordinary AND gates including diode or transistor configurations of well known arrangements for producing an output upon the application to the inputs thereof of coincident signals. One input of all the decode gates 48 to 50 is shown coupled to the output of the delay and function circuits 45. Each decode gate 48 to 50 has a separate input coupled to a separate one of the above described detectOr circuits 34 to 36. For example, decode gate 48 has one input thereof coupled to an output of detector 34; decode gate 49 has one input coupled to an output of detector 35; and decode gate 50 has one input connected to an output of detector 36. Each of the decode circuits 48 to 50 has an output coupled to a suitable display device 51, 52 and 53 shown schematically as indicating lamp assemblies, although audible as well as other functional types of display or alarm circuitry may be utilized as well. In a manner similar to that described for transceiver 10, the digital processing circuitry has each of the individual and above-noted modules, included therein, energized from a power supply 55 having inputs thereof also coupled to the a.c. power lines 20. Further included in the processing circuitry 30 is a master alarm 56 having an input coupled to the output of the delay and function circuit 45. The function of the master alarm 56 is to provide a signal which may be visual or audible or both upon the receipt of a signal at its input which is representative of an intrusion at any one or more of the locations monitored.

A further circuit to be described in greater detail subsequently is referenced to as a safe exit timing circuit 57. Briefly, the function of the safe exit timing circuit 57 is to permit a guard or other security officer to enter or leave any of the monitored locations for a period of time without triggering the alarm condition. This feature permits the guard to set the System for night operation without necessitating the use of an additional security officer at the console.

THEORY OF OPERATION

Assume for the purposes of the following explanation that one area which is the area monitored by the transceiver 10 is being intruded upon. In this manner, the signal reflected from the intruder is received by the antenna 11 and is coupled via the circulator 12 to the input of the mixer 13 which also receives a suitable portion of the local oscillator 15 energy to provide at its output the sum and difference signals indicative of the DoPpler effect. The filter amplifier 14 serves to respond to the lower side band or difference frequency to produce a series of square waves or pulses having their repetition rate and duration determined by the Doppler frequency. The output of the filter amplifier serves to pulse the carrier oscillator 16 so that the output of the carrier oscillator 16 is a series of pulses each having a duration including a number of cycles of the carrier oscillator frequency, which number is a function of the Doppler signal. The carrier oscillator 16 has its output coupled to the a.c. line and this pulsed oscillator signal frequency is transmitted conventionally by the 60 cycle power lines and is applied to the inputs of the location filters 31 to 33 included in the processing circuit 30. The location filter 31 has a bandwidth determined by the bandwidth of the anticipated Doppler frequency shifts and centered about a frequency determined by the frequency of carrier oscillator 16. Therefore, upon receipt of the signal, due to the disturbances at the location covered by transceiver 10, the location filter 31 is the only one which has a frequency response suitable to propagate that signal as developed by transceiver 10. Therefore, the pulsed oscillator signal coupled via the 60 cycle lines is applied to the input of the detector 34 which responds to the peaks of this signal to provide a pulse train at its output representative of the Doppler frequency. Such a peak detector 34 effectively removes the carrier oscillator signal and provides at its output a signal which in essence is the Doppler signal as used to pulse the carrier oscillator 16. This signal possesses transitions both in positive and negative directions between a first and second voltage level, and repetition rates which are due to the velocity at which the intruder is moving. Such transitions therefore appear at the output of the OR gate 38. Control circuit 40 is responsive to initial transition and is triggered thereby, thus causing the control circuit 40 to activate both the Resetable Timer 41 and the Run-Out Timer 42. Successive transitions reset Timer 41 while permitting Run-Out Timer 42 to continue running. The Run-Out Timer 42 is selected to have a duration greater than the duration of any one of the pulses due to the Doppler frequency. The Resetable Timer 41 has a duration which is less than the Run-Out Timer and greater than the anticipated Doppler frequency. If there is a valid intrusion at the particular location, the continuous pulse input to circuit 40 will prevent Timer 41 from completing a cycle and therefor Run-Out Timer 42 will time out and cause a pulse to be transmitted to the delay and function circuits 45. The delay and function circuits 45 may be, for example, bistable multivibrators or delay gates. When the delay circuit exhibits the change of state, this condition enables all the inputs of the decode gates 48 to 50 which are coupled to the output of the delay circuit 45. The other input of decode gate 48 is also enabled by this condition by the coupling of the input of the detector circuit 34 which because of the above-noted intrusion also exhibits transitions. Therefore, the indicator light 51 coupled to the output of the decode gate 48 is pulsed on and off in accordance with the Doppler signal as transmitted by the transceiver 10 or by means of another frequency as will be explained further. This informs the security guard or other person that an intrusion is taking place at the location indicated by lamp 51. Since the master alarm is also coupled to the output of the delay and function circuit, this will also be triggered and will activate a suitable indicating device as well. Accordingly, due to the fact that the output of the delay and function circuits 45 is energized, this serves to give the security guard a master indication that one of the monitored areas is being intruded upon although not particularly distinguishing which one, as this location was specified by lamp 51.

Now assume that the transceiver 10 has produced a Doppler shift due to a transient condition such as a lightning discharge or some other relatively random motion or disturbance which is not due to the presence of some unauthorized person on the location. In this manner, a pulse will be indicated again by detector 34 which will activate the OR gate 38 which will trigger the bistable circuit 40 which will activate the Run-Out and Resetable Timers 41 and 42. However, if the motion is not continuous, the Resetable Timer 41 times out before the Run-Out Timer 42, the delay circuit 45 will never energize the common inputs of the decode circuits 48, 49 and 50 or the master alarm 56 and, hence, such an extraneous "Doppler shift" will not be utilized to indicate a security violation to the guard. Resetable Timer 42 serves to reset the entire system, which is again primed for detection. If the production of extraneous pulses is random enough, the Resetable Timer 41, as adjusted by knowing the anticipated Doppler frequency shifts due to a valid intrusion, will run out thus serving to reset the bistable circuit 40 to its initial state readying the system again.

If there are multiple intrusions occurring simultaneously at more than one location, the effect of this would be to activate, for example, both detectors 34 and 35, which would cause the OR gate 38 to pass all transitions to the bistable circuit 40. In essence, such operation would tend to increase the number of transitions at the output of the OR gate 38 and would effectively cause the Run-Out Timer 42 to time out which would therefore again serve to activate the inputs of all the decode gates 48 to 50 as described above. Since intrusions occurred at both locations 1 and 2, the other inputs of gates 48 and 49 would also be energized causing both indicators 51 and 52 to flash accordingly and thereby inform the guard of the locations of the multiple intrusion, while again activating the master alarm 56.

Therefore, it can be seen from the above description that the processing circuit 30 described in conjunction with FIG. 1 is suitable for monitoring a plurality of remote locations and informing a guard or security officer as to an intrusion at any one or all of said locations, independent of where they are located with respect to the location of the processing unit 30. Furthermore, for the sake of economy, the Doppler frequency shifts are conveniently propagated via the a.c. power lines on the carrier oscillator signal. The normal 60 cycle frequency and anticipated line transients are effectively ignored because of the application of the carrier oscillator 16 signal frequency to individually selective filters 31–33 for each location.

FIG. 1 also shows a switch contact 60 coupled between the input and output of the delay circuits 45. If the switch is activated, one removes the extra delay from the system and response and indication is faster. This is desirable as in high security areas where the security guard might wish to be quickly informed of any motion due to any disturbances therein.

Referring to FIG. 2, there is shown a detailed schematic diagram (FIG. 2A) of a portion of the digital processing circuitry 30 of FIG. 1.

An OR gate 65, analogous to the OR gate 38 of FIG. 1 has multiple inputs thereof, each one of which is coupled to the output of a separate detector circuit as 34 to 35 of FIG. 1. Upon receipt of a transition at any of the inputs, the output of the gate 65 follows the transition and applies the signal to the input of the AND gate 66. The other input of AND gate 66 is enabled at this time by the connection of the input to the output of a two gate bistable circuit 67.

The transition at the output of the AND gate 66 sets the two gate bistable circuit 68, which because of the gate arrangement locks up in the positive or one state. Such two gate bistable circuits as 67 and 68 are well known in the art and not considered part of this invention. The "one" state of bistable 68 activates the Run-Out Timer 42 via diode 71. The Resetable Timer 41 is activated by the output of gate 66 and begins the timing sequence in accordance with the received transition.

The timers 42 and 41 as shown utilize programmable unijunction transistors 73 and 74, commonly referred to as P.U.T. devices. Such devices are silicon double based diodes having a negative resistance characteristic for application in sawtooth or time delay circuits. The device will switch from a high impedance state to a low impedance state when the voltage on the anode electrode reaches the voltage on the "so-called" gate electrode.

For example, the time delay afforded by the Run-Out Timer 42 is developed by the R-C time constant including resistor 75 and capacitor 76. When the bistable circuit 68 reverse biases diode 71, capacitor 76 begins to charge towards $+V_{cc}$ via resistor 75. When the voltage on capacitor 76 reaches the voltage on the gate of the P.U.T. 73 determined by resistors 77 and 78, the device 73 goes from the high impedance to the low impedance state and the capacitor 76 discharges through the P.U.T. 73.

In operation, if there is a "one" to "zero" transition at the output of the "AND" gate 66, the bistable circuit 68 locks up in the "one" state and stays locked for all transitions thereafter. This removes the inhibit level (i.e., ground) from the cathode of diode 71 to permit the Run-Out Timer 42 to commence the timing sequence. Simultaneously, each "one" to "zero" transition at the output of gate 66, forward biases the diode 72 to reset the Timer 41. The following "zero" to "one" transition back biases the diode 72 and the Resetable Timer 41 begins to time out. Assuming a true intrusion exists, then, the transitions at the output of gate 66 are frequent and continuous.

Therefore, the Resetable Timer 41 is constantly charging and discharging via the diode 72 which is being forward and reversed biased for the transitions at the output of gate 66. Hence, the P.U.T. 74 never fires; but the Run-Out Timer 42 continues as the inhibit was removed therefrom by the change of state of bistable 68. Thus under the conditions of a true intrusion, the voltage across capacitor 76 causes the P.U.T. 73 to trigger discharging the capacitor 76 through the anode to cathode path of the P.U.T. 73, producing a pulse at the cathode (i.e., discharge current through the 100 ohm resistor). The pulse is applied to gate 80 whose output transition discharges the Resetable Timer 41 to assure, at this time, there is no charge on the timing (1.0 µfd) capacitor and also triggers the alarm bistable circuit 67.

Triggering of bistable 67 inhibits the AND gate 66 and therefore blocks all Doppler transitions at the output. The setting of the bistable 67 also activates inverting gate 81, which goes high and the output thereof is coupled to the base electrode of a master alarm transistor amplifier circuit 82 via a base resistor. Transistor amplifier 82 has an audible alarm 83 coupled between a source of reference potential and the collector electrode. The emitter electrode is referenced to $+V_c$. The potential applied to the base electrode causes the alarm to be energized thus producing an audible or other type alarm.

Also shown across the alarm 83 in shunt therewith is a lamp 84 and a relay coil 84, which may individually be activated or all activated or combinations thereof activated depending upon the settings of a mode switch 86 shown below and having four positions which will be described subsequently.

As indicated, the setting of bistable 67 blocks the AND gate 66 and therefore again permits the Resetable Timer 41 to start the timing sequence anew. However, during this mode there are no transitions at the output of gate 66 due to the inhibit from bistable 67. Thus, the Resetable Timer 41 times out. Therefore, when the timing capacitor (1.0 µfd) discharges through P.U.T. 74, a pulse is developed at the cathode, and gate 87 is energized. This action resets the bistables 67 and 68 and hence gate 81 again goes to the "low" stage and reverse biases transistor 82 in activating the alarm. However, if there is an intrusion occurring, Doppler transitions again appear at the output of gate 66 and the above-described sequence continues. Therefore, the Run-Out Timer 42 times out again activating the alarm, which stays on for the duration of the Resetable Timer 41. In this mode, the guard is informed of the intrusion by the beeping of the alarm for the above described period.

Simultaneously, the output of gate 81 which is being pulsed on and off during the intrusion is coupled to the input of OR gate 90 of FIG. 2B, having the output thereof coupled to one input of a plurality of location AND gates 91–98. Each AND gate 91–98 has another input coupled to the output of AND gates 101–108.

The output of each gate 91–98 is also coupled back to one input of the associated AND gates 101–108. The other input of the gates 101–108 is coupled to the output of one of the Location Detectors shown in FIG. 1. For example, one input of gate 101 is coupled to the output of Location Detector 34 of FIG. 1, one input of gate 102 is coupled to the Location Detector 35 of FIG. 1 and so on; for as many as eight separate locations shown herein, or as many other locations as may be necessary.

Each output of the gates 91–98 is coupled to a separate one of an input to gates 101 to 108 and are also coupled to the base electrode of transistor drivers for activating the same to energize the location indicator lamps coupled to the collector electrodes.

The operation is as follows. During the above-described intrusion, the output of gate 81 is pulsed on and off as are the inputs of gates 91–98 via the OR gate 90. Since the intrusion occurred at Location No., 1, the output of gate 101 is also changing due to the Doppler shift. Hence, AND gate 91 is activated as the two inputs thereto are energized thus activating transistor 109 and in turn feeding back to the gate 101 to keep the light on for the same duration as the alarm 82 of FIG. 2A. Hence, the guard hears the alarm 81 and sees the lamp indicating Location No. 1 blinking on and off.

For multiple intrusions, he would see multiple lights blinking on and off while hearing the same alarm. Therefore, he knows the exact location or locations, as the case may be, where the intrusion occurs by looking at the display and he hears the master alarm simultaneously generally indicating that at least one location has been intruded upon.

The above described sequence is the usual system operation with a guard on duty and is particularly advantageous as described.

The system has other modes of operation which will now be described individually for the settings of the mode switch 86.

Mode Switch 86 in Position S1

In this position, the cathodes of diodes 120 and 121 are placed at reference potential. The diode 121 inhibits gate 81 from activating transistor 82 thereby preventing the alarm from sounding and the indicator location lamps (FIG. 2B) from lighting even though Doppler transitions are being received.

The diode 120 inhibits a gate 122 whose operation will be described subsequently.

Mode Switch 86 in Position S2

In this position, gate 122 is again inhibited by the ground placed at the cathode of diode 124 by the switch 86.

Diodes 126 and 127 cause the bulb 84 and the audible alarm 83 to be coupled between the collector of transistor 82 and ground. Thus for transitions at the output of gate 81, both the lamp 84 and the alarm 83 are sounded giving the security guard both a visual and audible indication for an intrusion.

Mode Switch 86 in Position S3

In this position, gate 122 is again inhibited via diode 130. Diode 133 couples the lamp 84 to the collector of transistor 82. In this position, the guard only sees the flashing light for a Doppler intrusion. Such a mode of operation is desirable as due to the particular complex where the intrusion system operates an audible alarm may undesirably serve to notify both the guard and the intruder.

Mode Switch 86 in Position S4

In this position, the alarm 83, lamp 84 and the relay coil 85 are all energized. The contact 135 associated with the relay 85 closes thus enabling the application of power to some external alarm or remote alarm outside the monitored premises, as to a local police station, security headquarters, and so on.

A further switch 140 is shown coupled to the arm of the mode switch 86 and as shown, applies the ground at the arm of the switch needed to perform the above noted inhibits. With the switch 140 in the other position N, the ground reference is applied to diodes 141 to 143 permanently permitting all alarm mechanisms to operate continuously. The switch 140 is a secured switch and once activated into the N position by means of a key or combination switch assembly, prevents the guard or anyone from effecting intrusion detection by disabling the various types of alarms as described above.

Position S4 of mode selector switch 86 is the night position designated also as N and operates the circuitrY as follows. When the system is to be utilized, the switch position S4 enables one to use the benefits of the above described system without utilizing the services of a security guard. Therefore, for the night position of the switch, the gate 81 is inhibited and blocked. For a receipt of Doppler transitions which are caused by an actual intruder, the sequence concerning the operation of the Run-Out Timer 42 and the Resetable Timer 41 occurs as described above. In essence the Run-out Timer after completing its cycle triggers the alarm bistable 67 which now in turn energizes gate 122 which is not inhibited during this position as it was previously in the other positions because of the diodes 120, 124 and 130. Gate 81 cannot exhibit a transition to activate the transistor 82 because of the inhibit. The activation of gate 122 sets a delay bistable 150 which in turn primes one input of the delay bistable 151. But bistable 151 does not change state because of an inhibit placed thereon by the inverting gate 158 which, as will be described, is under the control of an Exit-Entrance delay timer circuit 155. Also, the setting of bistable 150 enables bistable 152 via the inverting gate 153 and the two input AND gate 154. The setting of the bistable 152 serves to remove the inhibit from the Exit-Entrance delay timing circuit 155 via diode 156. This circuit starts a timing sequence during this transition due to the setting of bistable 152. The timing afforded by the delay timer 155 is set to be equal to a minute or more. At the end of the interval, a pulse is produced in the cathode circuit of the programmable unijunction transistor used in timing circuit 155 to activate the inverter gate 158. The activation of gate 158 resets the bistable 152 and sets the bistable 151 thus activating transistor 82 and permanently locking the alarm for the Doppler transition.

It is seen during this mode that the alarm locks up the OR gate 90 of FIG. 2B and is activated by the output of the bistable circuit 151 and hence the indicator assemblies are also permanently energized thus enabling one to note which location was intruded on for the continuous alarm cycle. It is also seen that when the keyed switch 140 is placed in the N position, the operation of the system is as described above for the S4 position of the mode oscillator switch 86 and is independent of the setting of the mode selection switch 86. In view of the above described operation, it is noted that in the so called night positions (i.e., position 4 of switch 86 or the N position of switch 140) the alarm is activated only after the period indicated by the timing sequence of the safe exit timer. Therefore, when the user desires to place a switch in this position he can leave the premises without being indicated or causing an alarm to be set off by knowing the period provided by the safe Exit-Entrance delay timer circuit 155. It can also be seen that due to the simple operating nature of the system that the alarm transistor can be activated by the addition of another resistor or diode network coupled to the base circuit thereof so that one may energize the transistor manually thus activating the alarm circuits for any reason desired. Such reasons may be as in the case of an intrusion upon an area which is not being monitored and which intrusion is witnessed by the guard or in any other case whereby the guard may want to inform others of an unauthorized entrance on the premises without resorting to the Doppler detection aspects of the present system.

The digital processing circuitry of the above described system as shown in FIGS. 2A and 2B utilize the following components for operation. The gates including those AND gates and OR gates formulating the bistable circuits and the location circuits encompassed the SN 7400 integrated logic circuits available from the Texas Instrument Corporation, specifically:

| | |
|---|---|
| One input gates | SN 7430 |
| Two input gates | SN 7400 |
| Three input gates | SN 7410 |
| P.U.T. 73, 74, 190 | 1D13T |
| All diodes | 1N914's |
| All resistors | ¼ watt |
| All capacitors | ± 10% at 6 volts |
| +V$_{cc}$ | 5 volts |
| Alarm 83 | 5 volt Buzzer manufactured by Mallory Corporation |
| Lamp assemblies | 5 volts incandescent |
| Transistors | 2N4402 |

What is claimed is:

1. A detection system for detecting the presence of an intruder at any one of a plurality of locations, said detection system comprising:
   a. a plurality of Doppler systems, each having a radiation field for covering one of said plurality of locations for providing a given Doppler output signal in response to movement of an intruder in that location;
   b. a control circuit coupled to each of said Doppler systems, said control system adapted to produce an alarm signal in response to reception of a given Doppler output signal from any of said Doppler systems; and
   c. a plurality of locator circuits, each responsive to an alarm signal by said control circuit and to a given Doppler output signal from a different one of said Doppler systems, each of said locator circuits responsive to said alarm and given Doppler output signals to produce an intruder location indicating output.

2. A detection system according to claim 1 wherein said control circuit comprises gating means having a plurality of inputs each receiving said given Doppler output signal from a different one of said Doppler systems and for producing a single output in response to reception of a Doppler output from any of said Doppler systems; and each of said locator circuits comprises a location gate having a first input responsive to the occurrence of said alarm signal, a second input responsive to the given Doppler output signal from a different one of said Doppler systems, and an output for providing said location indicating output signal.

3. A system for monitoring the continuity of signal pulses comprising:
   a. a signal source means for producing signal pulses having transitions between first and second voltage levels;
   b. a first timing circuit means coupled to said source means and adapted to commence timing periods of a given duration in resPonse to pulse transitions to said first voltage level, and to be reset by said signal pulse transitions to said second voltage level;
   c. a second timing circuit means coupled to said source means and adapted to commence timing periods of particular duration larger than said given duration in response to initial occurrences of signal pulse transitions between said first and second voltage levels;
   d. reset circuit means coupled between said first and second timing circuit means and adapted to reset said second timing circuit means interrupting said timing periods of particular duration in response to each completion by said first timing circuit of a timing period of said given duration; and e. output means activated by said second timing circuit means in response to completion thereby of said timing period of said particular duration.

4. A system according to claim 3 wherein said second timing circuit means commences said timing periods of particular duration in response to initial signal pulse transitiOns from said first to said second voltage level.

5. A system according to claim 3 wherein said signal source comprises a condition responsive means for producing said signal pulses in response to the occurrence of a given condition.

6. A system according to claim 5 wherein said output means comprises an alarm means activated by said second timing circuit in response to completion thereby of said timing period of said particular duration.

7. A system according to claim 6 wherein said condition responsive means comprises a Doppler system for detecting movements of an intruder in an area under surveillance.

8. A system according to claim 5 wherein said condition responsive means comprises a plurality of condition responsive detectors each producing detection pulses in response to the occurrence of a different given condition and including combining means for producing said pulse transitions in response to reception of pulses from any of said condition responsive detectors, and a plurality of locator circuits each responsive to activation of said output means and to signal pulses from a different one of said condition responsive detectors, each of said locator circuits responsive to the activation of said output means and to signal pulses from said one of said condition responsive detectors to produce an intruder location indicating output.

9. A system according to claim 8 wherein said combining means comprises gating means having a plurality of inputs each receiving said signal pulses from a different one of said detectors and producing in response thereto said signal pulses having said transitions between said first and second voltage levels; and each of said locator circuits comprise a location gate each having a first input coupled to a separate input of said gating means and a second input coupled to the output of said second timing circuit means and responsive to completion thereby of a timing period of said particular duration to provide at the outputs of said gates a signal indicating which of said detectors produced the activating pulses.

10. A system according to claim 8 wherein said output means comprises an alarm means activated by said second timing circuit in response to completion thereby of said timing period of said particular duration.

11. A system according to claim 10 wherein each of said detectors comprises a Doppler system disposed to detect movements of an intruder in a different area under surveillance.

12. A system according to claim 11 wherein said second timing circuit means commences said timing periods of particular duration in response to initial signal pulse transitions from said first to said second voltage level.

* * * * *